B. F. HOLSTEIN AND H. L. GUNTER.
REEL ATTACHMENT FOR MOWING MACHINES.
APPLICATION FILED AUG. 23, 1920.
1,402,360.
Patented Jan. 3, 1922.
2 SHEETS—SHEET 1.
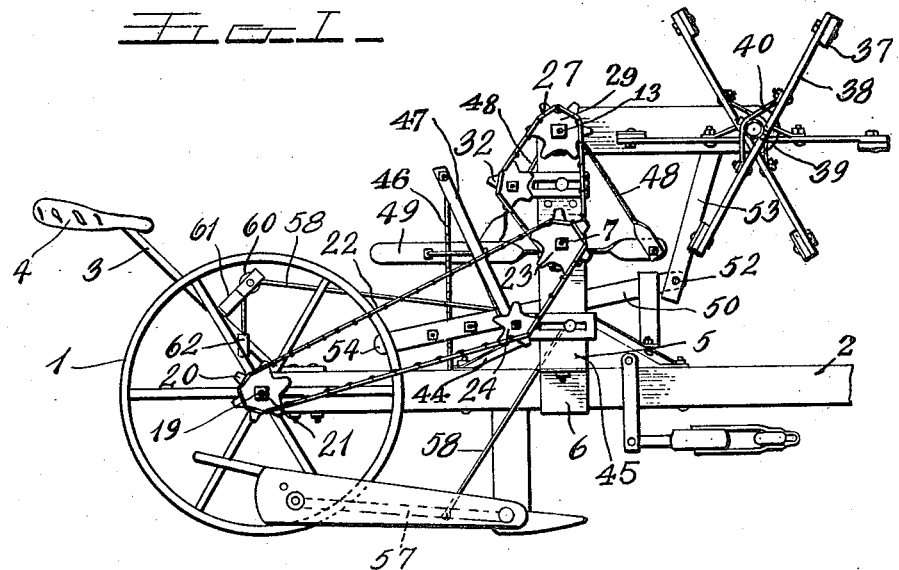
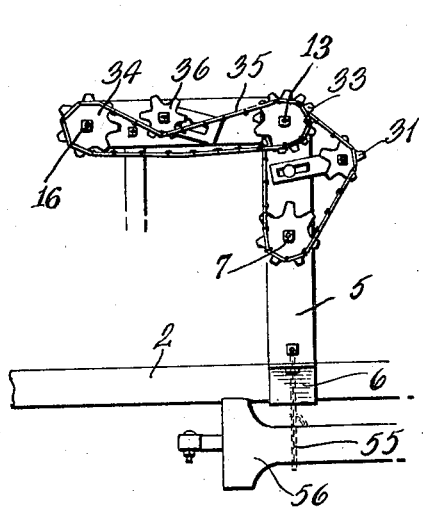
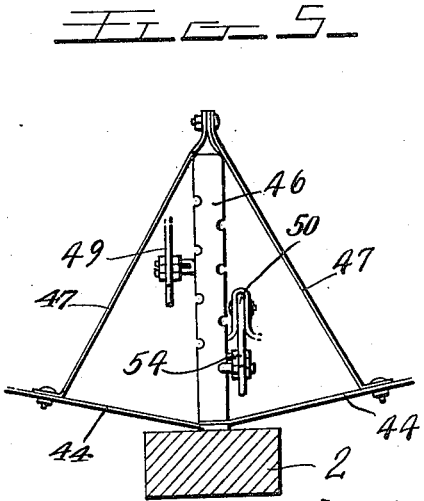
Inventors
Benjamin F. Holstein
Hiram L. Gunter
By Donald L. Mapson.
Attorney

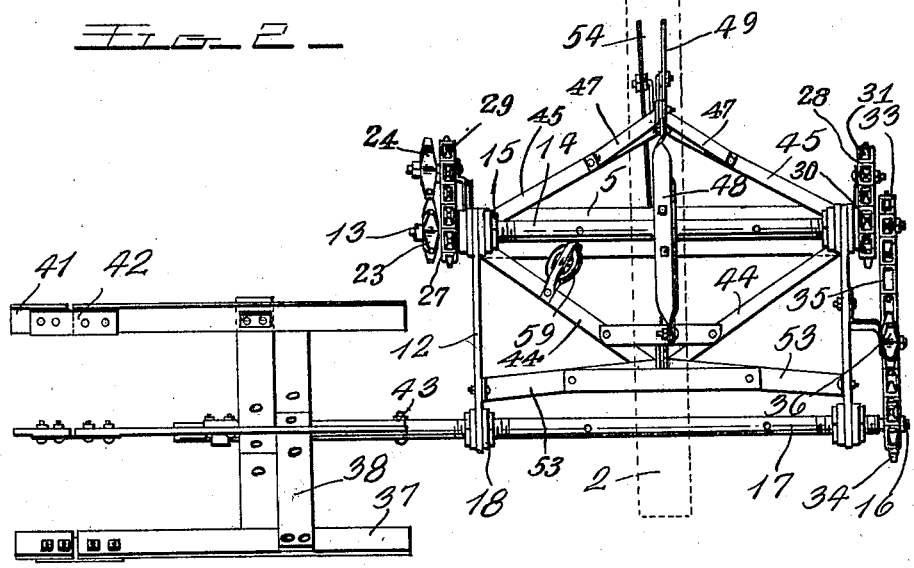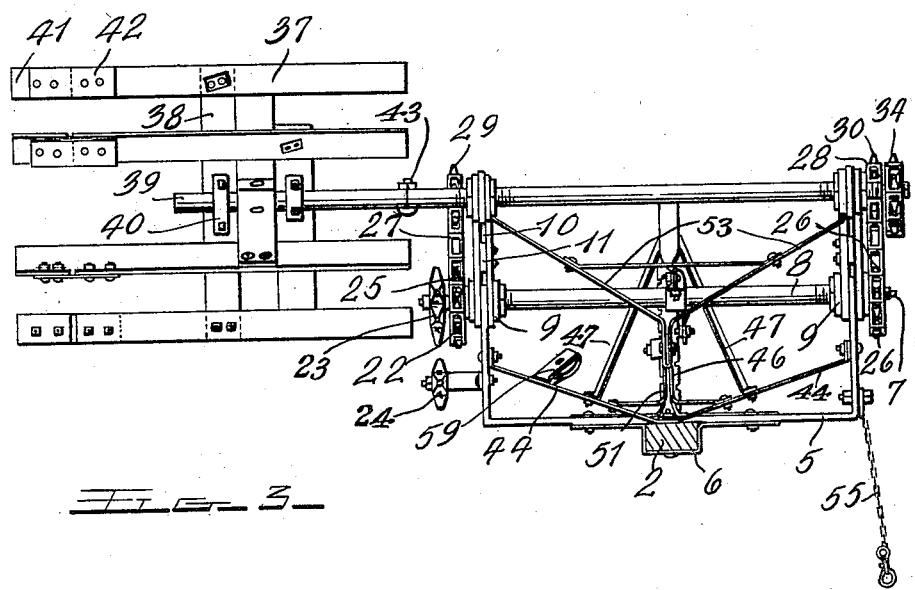

UNITED STATES PATENT OFFICE.

BENJAMIN F. HOLSTEIN AND HIRAM L. GUNTER, OF WAGENER, SOUTH CAROLINA.

REEL ATTACHMENT FOR MOWING MACHINES.

1,402,360.  Specification of Letters Patent.  Patented Jan. 3, 1922.

Application filed August 23, 1920. Serial No. 405,328.

*To all whom it may concern:*

Be it known that we, BENJAMIN F. HOLSTEIN and HIRAM L. GUNTER, citizens of the United States, residing at Wagener, in the county of Aiken and State of South Carolina, have invented certain new and useful Improvements in Reel Attachments for Mowing Machines, of which the following is a specification.

This invention relates to attachments for mowing machines, and more particularly to an adjustable reel adapted to be mounted upon the tongue of a mowing machine.

An object of the invention is to provide an adjustable reel attachment, which may readily be placed on any type of mowing machine, and which does not necessitate the use of any special fittings.

Another object is to provide a detachable reel for a mowing machine, which will be longitudinally and vertically adjustable, and which will operate direct from the wheels of the mower.

A further object is to provide a frame and drive mechanism for a reel attachment for a mowing machine, said frame and drive mechanism being detachably connected to the tongue of said mowing machine, and said reel being detachably connected to said mechanism.

Other objects will appear as the description proceeds.

In the accompanying drawings which form a part of my specification,

Figure 1 is a side elevation of a conventional type of mowing machine with my improved reel mechanism in operative position;

Figure 2 is a plan view of my improved reel and drive mechanism therefor;

Figure 3 is a front elevation of my improved reel and its driving mechanism;

Figure 4 is a side elevation of the gears and drive mechanism opposite those shown in Figure 1, and Figure 5 is a detail view of the operating levers, and cooperating rack.

Like characters of reference are used throughout the several views to designate corresponding parts.

My invention may be applied or attached to any conventional type of mowing machine having wheels 1, a tongue 2, and seat standard 3 with seat 4.

A U-shaped frame or bracket 5 is held firmly in position on the tongue 2, by means of the clamp 6. The shaft 7 is rotatably mounted between the free ends of the bracket 5, and has positioned about it, a collar or shaft casing 8, said shaft and casing being held in place by means of the locking nuts 9. A pair of arms 10 spaced one from the other, are pivotally mounted about the shaft casing 8, and are positioned at each side of the free ends of the bracket 5, and at the opposite ends thereof. These spaced arms 10 are reinforced by means of the blocks or spacing members 11.

Bracket or extension arms 12 are positioned between the free ends of the arms 10, and are rotatably mounted on the shaft housing or casing 14 about the shaft 13. These members or parts are held in operative position by means of the locking nuts 15. The free ends of the extension arms are connected together by means of the shaft 16 and the shaft casing 17, said parts being held in position by means of the locking nuts 18, similar to the locking nuts 9 and 15.

The nut 19, on the right hand wheel of the mower is unfastened, and the sprocket wheel 20 placed on the end of the axle 21, after which the nut 19 may be replaced or the wheel 20 held in place by any other suitable means. The drive chain 22 connects the wheel 20 with a sprocket wheel 23 on the shaft 7, for rotating the same. An idler sprocket 24 is attached to the frame or bracket 5 for keeping the chain 22 taut.

Sprocket wheels 25 and 26 are fixed at opposite ends of the shaft 7, and mesh with the chains 27 and 28, which in turn mesh with the sprocket wheels 29 and 30 on the opposite ends of the shaft 13. The idler sprockets 31 and 32 are adjustably mounted on the spaced arms 10, for maintaining the chains 27 and 28 taut.

On the left hand ends of the shafts 13 and 16 are fixed the sprocket wheels 33 and 34, which are connected by means of the chain 35, and held taut by means of the adjustable idler sprocket 36 on the arm 10. Thus it will be seen that the power is transmitted from the wheel of the mower to the shaft 7, from shaft 7 to shaft 13 and from shaft 13 to shaft 16.

The arms 37 of the reel are connected together by means of the cross braces 38, which in turn are fastened to the hollow shaft 39 by the clamps 40. The arms 37 are provided with extension fingers 41, held in place by means of the spring or resilient pieces 42. The reel is detachably secured to the shaft 16, by means of the bolt 43, or in any other suitable manner.

Brace rods 44 and 45 connect the tongue 2 in front and back of the frame 5 respectively, with the sides of the said frame. A rack 46 extends vertically from the tongue 2, and is formed with or without the braces 47.

A triangular shaped frame 48 is pivotally attached to the shaft casings 8 and 14, and is provided with a handle 49 for engagement with the rack 46. This handle 49 when operated causes the reel to be adjusted in a forward or backward manner. The lever 50 is pivoted to the support 51, and is pivotally connected at its outer end at 52 to the yoke frame 23 which connects the extension arms 12, for vertically adjusting the reel. On the end of the lever 50 is a handle 54 for engagement with the rack 46.

The chain 55 is attached to the bracket 5, and connects or fastens about the pitman housing 56 to counteract the weight of the reel and to keep the strain on the tongue 2 even.

The dumping mechanism 57 is of the usual construction, and has connected to its operating arm a cable 58, said cable passing over the pulley 59 on the brace rod 44, and extends rearwardly over the pulley 60 carried by the bracket 61 on the seat standard 3, to the stirrup 62.

It will be obvious that many minor changes in detail of construction may be resorted to without departure from the spirit of the invention.

Having thus described our invention what we claim as new and desire to secure by Letters Patent of the United States is:—

1. A reel attachment for a mowing machine comprising a substantially U-shaped frame, spaced arms pivotally mounted on the free ends of said frame, extension arms pivotally mounted at the ends of said spaced arms, shafts connecting the free ends of the frame and arms, sprocket wheels on the ends of said shafts, means connecting said sprocket wheels with each other for rotating the shaft connecting the free ends of the extension arms, and a detachable reel on the end of said last mentioned shaft.

2. A reel attachment for a mowing machine comprising a standard type mower, a tongue therefor, a frame engageable with said tongue, a rotatable reel carried by said frame, means for longitudinally and vertically adjusting said reel, a rack carried by said tongue, handles formed on the ends of said adjusting means for holding the reel in any one of a plurality of positions.

3. A reel for a mowing machine comprising a shaft, one or more cross arms clamped to said shaft, arms positioned at the outer ends of said cross arms, said arms having their ends provided with flexible extensions, an operating shaft and means for engaging and disengaging said reel from said last mentioned shaft when in operative or non-operative position.

4. A reel attachment for a mowing machine comprising a standard type mower, a tongue therefor, a frame carried by said tongue, a reel carried by said frame, a dump mechanism of usual construction, means carried by said frame for longitudinally and vertically adjusting said reel, and means for operating the same.

5. A reel attachment for a mowing machine comprising a standard type of mower, a tongue therefor, a frame carried by said tongue, a reel carried by said frame, means for longitudinally and vertically adjusting said reel, means for holding said reel in adjusted position, and means connecting said frame with said mower to counterbalance the weight of said reel and mechanism.

In testimony whereof we affix our signatures.

BENJAMIN F. HOLSTEIN.
HIRAM L. GUNTER.